US011258227B2

United States Patent
Louot et al.

(10) Patent No.: US 11,258,227 B2
(45) Date of Patent: Feb. 22, 2022

(54) DEVICE FOR GENERATING A POLYCHROMATIC PHOTON BEAM HAVING SUBSTANTIALLY CONSTANT ENERGY

(71) Applicants: CENTRE NATIONAL DE LA RECHERCHE SCIENTIFIQUE, Paris (FR); UNIVERSITÉ DE LIMOGES, Limoges (FR)

(72) Inventors: Christophe Louot, Limoges (FR); Dominique Pagnoux, Limoges (FR); Katarzyna Krupa, Limoges (FR); Badr Shalaby, Limoges (FR); Alexis Labruyère, Limoges (FR); Alessandro Tonello, Limoges (FR); Vincent Couderc, Verneuil-sur-Vienne (FR)

(73) Assignees: CENTRE NATIONAL DE LA RECHERCHE SCIENTIFIQUE, Paris (FR); UNIVERSITÉ DE LIMOGES, Limoges (FR)

( * ) Notice: Subject to any disclaimer, the term of this patent is extended or adjusted under 35 U.S.C. 154(b) by 804 days.

(21) Appl. No.: 16/072,078

(22) PCT Filed: Jan. 20, 2017

(86) PCT No.: PCT/FR2017/050126
§ 371 (c)(1),
(2) Date: Sep. 26, 2018

(87) PCT Pub. No.: WO2017/125693
PCT Pub. Date: Jul. 27, 2017

(65) Prior Publication Data
US 2019/0027890 A1 Jan. 24, 2019

(30) Foreign Application Priority Data
Jan. 22, 2016 (FR) ...................... 1650522

(51) Int. Cl.
*H01S 3/00* (2006.01)
*H01S 3/30* (2006.01)
(Continued)

(52) U.S. Cl.
CPC ............ *H01S 3/302* (2013.01); *H01S 3/0092* (2013.01); *H01S 3/06754* (2013.01);
(Continued)

(58) Field of Classification Search
CPC .. H01S 3/1695; H01S 3/0092; H01S 3/06754; H01S 3/302; H01S 3/1086;
(Continued)

(56) References Cited

U.S. PATENT DOCUMENTS

2009/0074023 A1\* 3/2009 Wadsworth ............. G02F 1/365
372/50.1
2013/0271765 A1\* 10/2013 Couderc ............... G01J 3/0218
356/402
2014/0056023 A1 2/2014 Hasegawa

FOREIGN PATENT DOCUMENTS

EP 1426795 A2 6/2004
JP H1-112788 A 5/1989
(Continued)

OTHER PUBLICATIONS

Jul. 20, 2020 Office Action issued in corresponding European Patent Application No. 17 706 845.9.
(Continued)

*Primary Examiner* — Mark Hellner
(74) *Attorney, Agent, or Firm* — Kenealy Vaidya LLP

(57) ABSTRACT

Some embodiments relate to a generation device that includes: a pulsed laser source generating primary photons having at least one wavelength within pulses having time dissymmetry, a forming device(s) controlling the primary photons so as to generate a selective-polarization, focused
(Continued)

input beam, and an optical fiber wherein the primary photons induce secondary photons having different wavelengths resulting from a raman conversion cascade and forming a wide-spectrum output beam having substantially constant energy.

19 Claims, 2 Drawing Sheets

(51) Int. Cl.
    *H01S 3/067*     (2006.01)
    *H01S 3/108*     (2006.01)
    *H01S 3/16*     (2006.01)
    *G01N 21/65*     (2006.01)
    *G02F 1/35*     (2006.01)

(52) U.S. Cl.
    CPC .......... *H01S 3/1086* (2013.01); *H01S 3/1695* (2013.01); *G01N 2021/653* (2013.01); *G01N 2021/655* (2013.01); *G02F 1/3528* (2021.01)

(58) Field of Classification Search
    CPC ... G02F 1/35; G02F 1/3528; G01N 2021/655; G01N 2021/653
    See application file for complete search history.

(56) References Cited

FOREIGN PATENT DOCUMENTS

| | | | | |
|---|---|---|---|---|
| JP | 2008084904 A | * | 4/2008 | ............... H01S 3/10 |
| JP | 2013-545974 A | | 12/2013 | |
| JP | 2014-532894 A | | 12/2014 | |
| JP | 2015-118245 A | | 6/2015 | |
| WO | WO2010/023438 A1 | | 3/2010 | |

OTHER PUBLICATIONS

T. Erneux et al: "The pulse shape of a passively a-switched microchip laser", European Physical Journal D: Atoms, Molecules, Clusters Andoptical Physics, vol. 10, No. 3, Jan. 1, 2000 (Jan. 1, 2000), pp. 423-431.

J. J. Zayhowski et al: "Diode-pumped passively a-switched picosecond microchip lasers", Optics Letters, vol. 19, No. 18, Sep. 15, 1994 (Sep. 15, 1994), pp. 1427-1429.

G J Spuhler et al: "Experimentally confirmed design guidelines for passively Q-switched microchip lasers using semiconductor saturable absorbers", Journal of the Optical Society of America B, vol. 16, No. 3, Mar. 1, 1999 (Mar. 1, 1999), pp. 376-388.

Mussot, A., et al., "Generation of a broadband single-mode supercontinuum in a conventional dispersion-shifted fiber by use of a subnanosecond microchip laser," Optics Letters 2003;28(19):1820-1822.

Okuno, M., et al., "Ultrabroadband (>2000 cm-1) multiplex coherent anti-Stokes Raman scattering spectroscopy using a subnanosecond supercontinuum light source," Optics Letters 2007;32(20):3050-3052.

International Search Report and Written Opinion for PCT Patent App. No. PCT/FR2017/050126 (dated May 10, 2017) with English language translation of the ISR.

Jan. 26, 2021 Notice of Reasons for Rejection issued in corresponding Japanese Patent Application No. 2018-538572. (in English).

* cited by examiner

DEVICE FOR GENERATING A POLYCHROMATIC PHOTON BEAM HAVING SUBSTANTIALLY CONSTANT ENERGY

CROSS REFERENCE TO RELATED APPLICATIONS

This application is a national phase filing under 35 C.F.R. § 371 of and claims priority to PCT Patent Application No. PCT/FR2017/050126, filed on January 20, which claims the priority benefit under 35 U.S.C. § 119 of French Patent Application No. 1650522, filed on Jan. 22, 2016, the contents of each of which are hereby incorporated in their entireties by reference.

BACKGROUND

Some embodiments relate to devices for generating a polychromatic beam of photons, and to analyzing systems that use such devices.

In certain fields, such as, for example, that of the analysis of samples (possibly medical samples), there is a need for laser sources that deliver a beam of photons having wavelengths that are distributed substantially continuously over a large spectral width, typically a few tens of nanometers to a few hundredths of nanometers. Such polychromatic sources are frequently called continua.

As those of ordinary skill in the art know, these sources are produced on the basis of a light-matter interaction that involves non-linear effects. They frequently include at least one pulsed laser source that delivers "primary" photons having a "primary" wavelength, and a microstructured optical fiber, so as to produce, from the primary photons, an output beam including secondary photons having a plurality of "secondary" wavelengths. The expression "microstructured optical fiber" is here understood to mean an optical fiber, generally made of silica, in which are defined microstructures that are intended to confine the luminous power, to increase the light-matter interaction and thus to improve the conversion of the primary wavelength to a large number of secondary wavelengths. For example, these microstructures may form a Bragg grating arranged transverse to the direction of propagation of the light in the optical fiber and able to modify the dispersion relationship seen by the light.

Such sources employing a microstructured optical fiber advantageously allow stable emissions with a spectral width extending from the near ultraviolet (or UV) (about 350 nm) to the mid infrared (typically 5 μm) to be obtained. Microstructured optical fibers made of silica are for example limited in the infrared to 2.4 μm.

SUMMARY

However, non-linear microstructured optical fibers have a small core diameter and therefore, in the presence of a high confinement of energy, the threshold for damage of their material is very quickly reached. Thus, these sources employing a microstructured optical fiber do not allow high output energies to be obtained. In addition, the pumping of microstructured optical fibers in the normal dispersion domain induces a discontinuous generation of the conversion spectrum via the stimulated Raman effect. Lastly, the conversion of wavelengths in the abnormal dispersion domain, in picosecond and nanosecond excitation regimes, is dominated by soliton effects that induce a spectrogram that prevents the various secondary wavelengths of the output beam that are generated at different locations in the temporal profile of the pulse used from being discriminated in the time domain. Under these conditions, it is impossible to use these sources in certain applications, such as for example multiplex coherent anti-Stokes Raman scattering (CARS) without in addition implementing a spectroscopic analysis of the fluorescence radiation. This multiplex CARS microspectroscopy is in particular used in the field of imaging to identify and locate specific chemical species within a sample.

Some embodiments are directed to addressing the above.

Some embodiments are directed to a device that is configured to generate a polychromatic beam of photons, and that includes a pulsed laser source that is able to deliver primary photons having a least one wavelength, forming device(s) that are able to act on the primary photons to deliver a focused input beam having a chosen polarization, and an optical fiber that is arranged to produce, from the input beam, a polychromatic output beam including secondary photons having a plurality of wavelengths.

This generating device is configured such that its pulsed laser source is able to deliver the primary photons in pulses having a temporal asymmetry that is such as to induce secondary photons having various wavelengths, resulting from a cascade of Raman conversions and forming a broad-spectrum output beam having an energy that is distributed substantially constantly.

Each secondary wavelength created via the non-linear effect then possesses a specific arrival time during the duration of the pump pulse (primary photons), this allowing it to be characterized by a single delay. This distribution over time, of the secondary photons, is a result of a non-linear dynamic response exacerbated by the asymmetry in the pump pulse.

Thus, by using a non-microstructured optical fiber (for example a standard optical fiber (such as a HI 980 optical fiber) of larger core) pumped with temporarily asymmetric pulses, it is possible to obtain a continuum of photons of energy the amplitude of the spectrum of which is substantially constant.

The device according to some embodiments may have other features that may be implemented separately or in combination, and in particular:

- the pulsed laser source may deliver a power density per meter of optical fiber that induces a non-linear generation of the secondary photons that is spread over time depending on their respective wavelengths;
- for example, the power density per meter of optical fiber may be higher than 0.2 kW/μm²/m;
- it may include a filter installed downstream of the optical fiber and able to let pass only secondary photons having wavelengths included in a predefined interval, in order to deliver a filtered output beam taking the form of pulses of a duration equal to their difference in spread over time;
- it may include, between the optical fiber and the forming device(s), desymmetrization device(s) which are able to increase the temporal asymmetry of the input beam;
- the optical fiber may be a single-mode fiber or indeed a multimode fiber;
- the pulsed laser source may be able to deliver the primary photons in pulses having a duration included between a few hundredths of nanoseconds and a few tens of nanoseconds;
- it may include a resonant cavity including a dichroic entrance mirror able to receive the input beam, and an exit mirror that is able to deliver the output beam;

the optical fiber may be doped with rare-earth ions. In this case, it also includes an auxiliary laser source that is able to inject, into the optical fiber, auxiliary photons that are intended to interact with the rare-earth ions in order to induce an amplification of the primary photons, so as to allow an increase in the conversion to secondary photons;

as a variant, the optical fiber may be doped with ions that are able to exacerbate non-linear effects in the optical fiber in order to induce an increase in the conversion to the secondary photons.

Some embodiments may be directed to a sample-analyzing system including at least one generating device of the type presented above and able to deliver a polychromatic output beam for analyzing the sample.

For example, such a system may be able to analyze the sample using multiplex coherent anti-Stokes Raman scattering (or CARS). In this case, this system may also include a temporal detector.

BRIEF DESCRIPTION OF THE FIGURES

Some embodiments will be better understood on reading the following description, which is given merely by way of example, and with reference to the appended figures, in which.

DETAILED DESCRIPTION OF EXEMPLARY EMBODIMENTS

Figure 1:
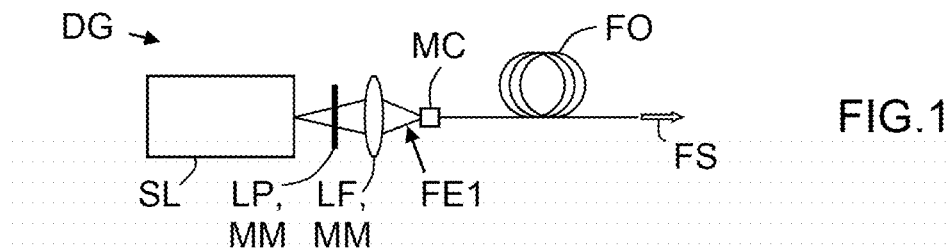
FIG. 1 schematically and functionally illustrates a first embodiment of a generating device according to some embodiments.

Some embodiments are directed to a device DG intended to generate a polychromatic beam of photons FS and the energy (or power) of which is distributed substantially constantly.

Below, the generating device TG is considered, by way of nonlimiting example, to be intended to form part of a sample-analyzing system (optionally for analyzing medical samples). However, some embodiments are not limited to this type of system. Specifically, it relates to any system required to include at least one device able to generate a polychromatic beam of photons and the energy (or power) of which is substantially constant.

Moreover, the analyzing system will be considered below, by way of nonlimiting example, to be able to analyze samples using multiplex coherent anti-Stokes Raman scattering (or multiplex CARS microspectroscopy). Such samples may, for example, be blood samples. However, some embodiments are not limited to this type of analysis.

Generally, some embodiments relate to many domains, and in particular bio photonics (and in particular cellular diagnostics), coherence tomography, flow cytometry, the screening of chemical elements remotely (for example for airport security), the inspection of individuals (for example in the medical field), the detection of explosives and the detection of bacteria.

FIGS. 1 and 4 to 6 schematically show four nonlimiting embodiments of a generating device DG according to some embodiments.

As illustrated, a (generating) device DG includes at least one pulsed laser source SL, forming device(s) MM, and an optical fiber FO devoid of microstructure.

The pulsed laser source (or pump laser) SL is able to deliver what are called "primary" photons that have a wavelength that is called the "primary wavelength" below. This primary (or pump) wavelength is chosen depending on the applicational requirements, and therefore on the desired spectral band. Therefore, it will possibly belong to the infrared (or IR) domain, to the visible domain or to the ultraviolet (or UV) domain. These primary photons may also belong to one or more domains such as for example an infrared wavelength and its second harmonic.

In addition, the pulsed laser source SL is able to deliver the primary photons in pulses that have a temporal asymmetry. The advantage of this temporal asymmetry will be returned to below.

For example, this pulsed laser source SL may provide a high peak power. In this case, it will possibly, for example, include an Nd:YAG laser producing photons at 1064 nm with pulses ranging from 10 ps to 10 ns.

This temporal asymmetry may be obtained by virtue of a saturable absorber introduced into the laser cavity of the laser source SL and by virtue of the dynamic response of the variation in the laser gain in this laser cavity. The rising front of the pulse is set by the laser gain and the speed of saturation of the absorber whereas the falling front is controlled by the dynamic response of depletion of the laser gain and the reopening of the saturable absorber. Since the dynamic responses of the saturation and reopening are different, an asymmetric pulse is obtained.

The forming device(s) MM are able to act on the primary photons in order to deliver a focused input beam FE having a chosen polarization. This polarization (or direction of oscillation of the field) is set by the laser source SL. It may be turned or modified with a half-wave plate or a quarter-wave plate on the exterior of the laser cavity of the laser source SL in order to promote certain non-linear effects. The orientation/modification of the polarization with respect to the optical fiber FO therefore allows the final spectrum to be (moderately) modified.

For example, and as illustrated, these forming device(s) MM may include, downstream of the pulsed laser source SL with respect to the direction of propagation of the primary photons, at least one wave plate LP that is able to confer the chosen polarization on the primary photons and a focusing lens LF that is able to focus the primary photons on the entrance of the optical fiber FO. It will be noted that the wave plate LP could be placed after the focusing lens LF. For example, and on the basis of the initial polarization delivered by the laser source SL, the polarization conferred by the wave plate LP may be circular, elliptical or linear.

The optical fiber FO is able to receive the input beam FE and is arranged to produce, from the input beam FE, a polychromatic output beam FS including what are called "secondary" photons having a plurality of wavelengths. For example, and as nonlimitingly illustrated, the entrance end of the optical fiber FO may be securely fastened to coupling devices MC, which receives via an entrance the focused input beam FE. These coupling devices MC may, for example, take the form of a microlens coupler that is tasked with more precisely refocusing the focused input beam FE into the core of the entrance end of the optical fiber FO.

This optical fiber FO is advantageously or preferably of standard type, in order to possess a larger core than that of non-linear microstructured optical fibers. It may, for example, be made of silica or of another material such as for example telluride, a chalcogenide or a fluorine-containing glass, and may optionally be doped. It may for example be a HI 980 or HI 1060 optical fiber.

It will be noted that to obtain the effect described below, it may be necessary for the pump wavelength (of the laser source SL) and for most of the output spectrum generated by the device DG to be in the normal dispersion regime. Specifically, in an abnormal dispersion regime soliton effects garble the spectro-temporal distribution.

The temporal asymmetry of the pulses delivered by the pulsed laser source SL is able to induce, in the optical fiber FO, what are called "secondary" photons that have various wavelengths resulting from a cascade of Raman conversions, and that form a broad-spectrum output beam FS having an energy that is distributed substantially constantly.

Each wavelength then possesses an arrival time that allows it to be identified by a single time delay within the initial laser pulse.

The propagation of the primary and secondary photons in the core of the optical fiber FO and the "duplication" of these primary and secondary photons by Raman conversion to various Stokes waves provokes, during the propagation, a uniform broadening of the spectrum of Stokes lines, thereby allowing a balanced redistribution of the energy over a wide wavelength range and therefore the obtainment of a substantially constant energy whatever the wavelength of the secondary photons of the output beam FS. In other words, the generating device DG is an (ultra)flat-spectrum polychromatic laser source.

Figure 2:
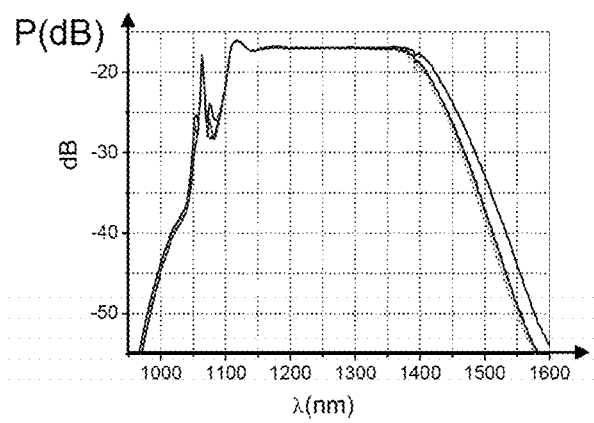
FIG. 2 schematically illustrates, via a plot, an example of the variation in the power (P in dB) of the output beam of a generating device according to some embodiments as a function of wavelength (A in nm)

FIG. 2 shows an example of the variation in the power (in dB) of the output beam FS of the generating device DG as a function of wavelength A (in nm). As may be seen, here a spectrum that is particularly flat in the energy domain, and therefore well suited to many applications, and in particular to multiplex CARS microspectroscopy, is obtained.

Figure 3:
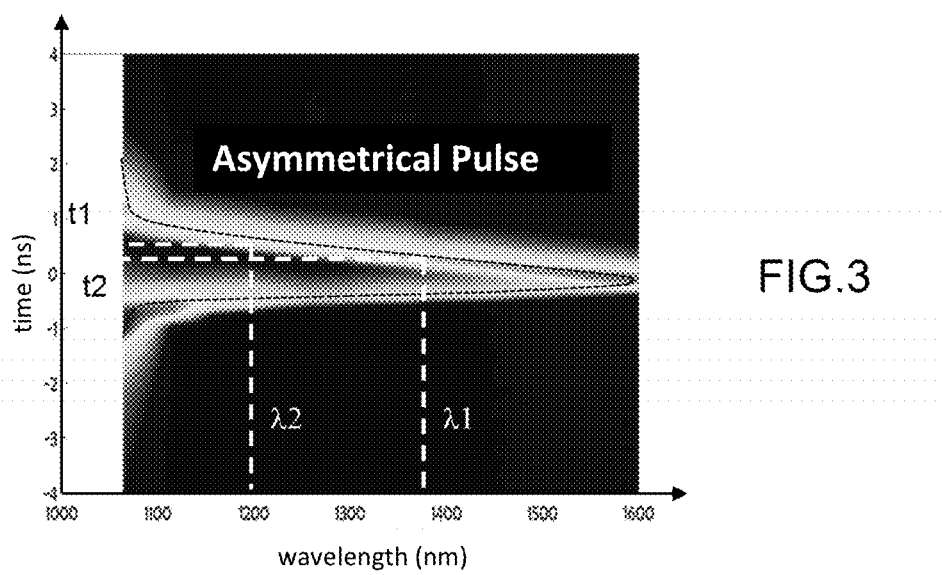
FIG. 3 schematically illustrates, via a plot, an example of the variation in the power of the output beam of a generating device according to some embodiments in the time and wavelength domains.

FIG. 3 illustrates an example of the variation in the power of the output beam of a generating device DG in the time domain (in ns) and in the wavelength domain (in nm). This example illustrates the temporal spreading of the wavelengths of the output beam FS that allows them to be identified by a single time delay. As may be seen, a spectro-temporal distribution of the secondary photons is obtained during the duration of the pump pulse (primary photons).

It will be noted that the pulsed laser source SL may be able to deliver the primary photons in pulses that deliver a power density per meter of optical fiber FO that induces a non-linear generation of the secondary photons that is spread over time depending on their respective wavelengths. Thus an asymmetry is obtained in the spectro-temporal plot.

In this case, the dynamic response of depletion of the non-linear Raman effect in the over-saturation regime allows a spectro-temporal emission distribution to be obtained that is fundamentally different from that obtained in prior-art microstructured-fiber devices. Specifically, each wavelength of the spectrum may be identified by a different time of appearance. The secondary-photon generation delay, which has a spread that is a function of the respective wavelengths of the secondary photons, allows a spectroscopic analysis to be performed by virtue of a temporal detector including, for example, a photodiode and an oscilloscope. This spread over time is initiated by the Raman conversion in over-saturation regime during the duration of the pump pulse delivered by the laser source SL.

For example, this power density per meter of optical fiber FL, which allows the profile of the spectrum to be controlled, may be chosen to be higher than $0.2$ kW/$\mu$m$^2$/m for a pulse of a duration of about 1 ns. Advantageously or preferably, it is even advantageous or preferable to choose it to be higher than $0.3$ kW/$\mu$m$^2$/m. Specifically, such power densities allow a saturation of the Raman effect that is favorable to the obtainment of an ultra-flat spectrum with a spread of wavelengths over time to be induced. It will be noted that this spreading time does not exceed the total duration of the initial pump pulse.

This spread over time may advantageously allow the generating device DG to deliver an output beam FS taking the form of pulses of a chosen and variable duration. Specifically, by adding thereto, downstream of its optical fiber FO, a filter that are able to let pass only secondary photons having wavelengths included in a predefined interval, it may deliver a filtered output beam FS taking the form of pulses the duration of which is equal to the difference in the spread over time of the secondary photons the wavelengths of which are equal to the limits of this interval. It is thus possible to obtain pulses of the order of a nanosecond or of a picosecond or even of a femtosecond, depending on the application requirements.

Figure 4:
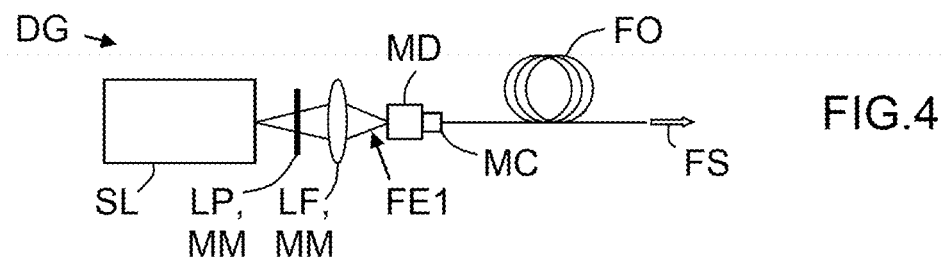
FIG. 4 schematically and functionally illustrates a second embodiment of a generating device according to some embodiments.

It will also be noted, as nonlimitingly illustrated in the second example of FIG. 4, that the generating device DG may also include, between its optical fiber FO and its forming device(s) MM, (active or passive) desymmetrization device(s) MD which are able to increase the temporal asymmetry of the input beam FE. Specifically, this allows the spread over time to be increased.

For example, these desymmetrization device(s) MD may be what are called "saturable absorption" devices or "reverse saturable absorption" devices. Specifically, the rising front then depends on the saturation of the saturable absorber (or reverse absorber), whereas the falling front depends on the return of the saturable absorber (or reverse absorber) to an equilibrium state. In other words, the different behavior of the saturable absorber (or reverse absorber) during its opening and its closure induces an asymmetry in the temporal profile of each pulse.

It will also be noted that the optical fiber FO is advantageously or preferably a single-mode fiber. However, in one variant embodiment it could be a multi-mode fiber (in particular in order to allow the passage of more power).

It will also be noted that the pulsed laser source SL may be able to deliver the primary photons in pulses that have a duration included between a few hundredths of nanoseconds and a few tens of nanoseconds. For shorter durations the effects of dispersion become a hindrance, and for longer durations it becomes difficult to obtain pulses with high peak powers.

Figure 5:
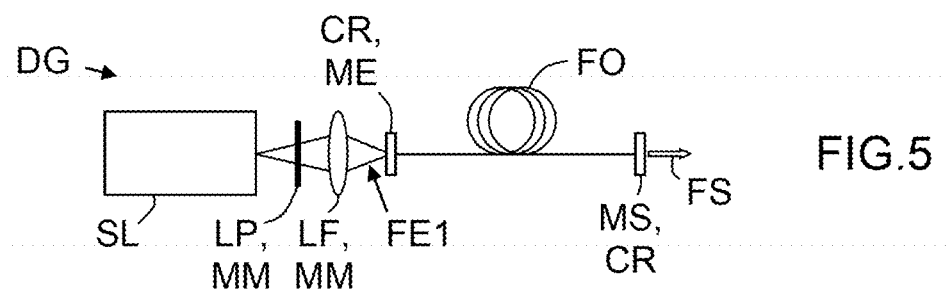
FIG. 5 schematically and functionally illustrates a third embodiment of a generating device according to some embodiments.
Figure 6:
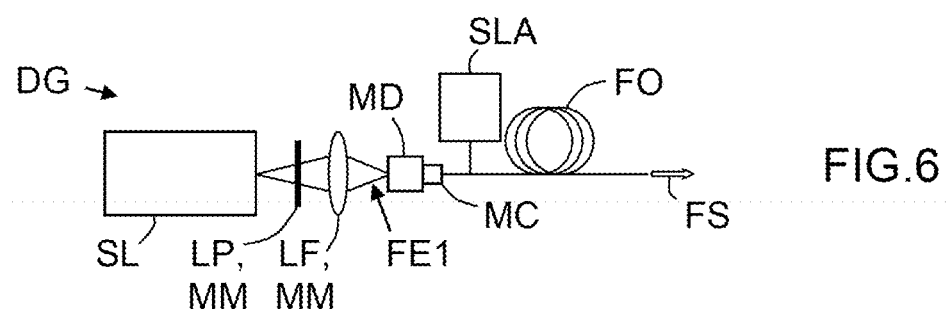
FIG. 6 schematically and functionally illustrates a fourth embodiment of a generating device according to some embodiments.

It will also be noted, as nonlimitingly illustrated in the third example of FIG. 5, that the generating device DG may also include a resonant cavity CR housing its optical fiber FO. This resonant cavity CR allows a secondary-photon oscillation that is able to induce an amplification of the non-linear conversion. This cavity is advantageously or preferably used with long primary pulses. Such a resonant cavity CR may include, on the one hand, a dichroic entrance mirror ME that is able to receive the input beam FE and, for example, to which is securely fastened the entrance of the optical fiber FO, and, on the other hand, an exit mirror MS, for example to which is securely fastened the exit of the optical fiber FO, and which is able to deliver the exit beam FS.

It will also be noted that the optical fiber FO may be doped with rare-earth ions. In this case, and as nonlimitingly illustrated in the fourth example of FIG. 6, the generating device DG may also include an auxiliary laser source SLA that is able to inject, into the optical fiber FO, auxiliary photons that are intended to interact with the rare-earth ions in order to induce an amplification of the generation of the photons, which amplification of the primary photons then allows the conversion to secondary photons to be increased. For example, the emission wavelength of the auxiliary laser source SLA may be equal to 980 nm for ytterbium (Yb) and erbium (Er) ions, or to 808 nm for neodymium (Nd) ions.

The amplification of the primary photons in the fiber may also increase or decrease the asymmetry of the primary pulse by amplifying in different ways the rising front and the falling front of the pulse. This mechanism depends on the differential laser-gain saturation engendered by the various portions of the pulse.

As a variant, the optical fiber FO may be doped with ions that are able to exacerbate non-linear effects therein in order to induce an increase in the conversion to the secondary photons. These ions may, for example, be germanium ions.

Some embodiments have several advantages, among which:
- it makes it possible to obtain a (super-)continuum with a high spectral power density because the cross section of the core of the optical fiber used is much larger than the cross section of a non-linear microstructured optical-fiber core;
- it allows problems with energy fluctuation in (super-)continuum sources based on microstructured optical fibers to be solved;
- it allows the coherence of the wide-band emission to be improved, coherence generally being deteriorated by soliton propagation in (super-)continuum sources based on microstructured optical fibers;
- it allows optical fibers that are less expensive than those possessing a transverse periodic structure to be used; and
- it allows a specific spectro-temporal distribution to be obtained.

Some embodiments have been illustrated and described in detail in the drawings and the preceding description. The latter must or should be considered to be illustrative and given by way of example and not as limiting some embodiments to this description alone. Many variant embodiments are possible.

The invention claimed is:

1. A device for generating a polychromatic beam of photons, comprising:
    a pulsed laser source that is configured to deliver primary photons having a wavelength, a forming device able to act on the primary photons to deliver a focused input beam having a chosen polarization,
    an optical fiber that is arranged to produce, from the input beam, a polychromatic output beam including secondary photons having a plurality of wavelengths, wherein the pulsed laser source is able to deliver the primary photons in pulses having a temporal asymmetry such as to induce secondary photons having various wavelengths, resulting from a cascade of Raman conversions, the pulsed laser source configured to deliver a power density per meter of optical fiber that induces a non-linear generation in the saturation regime of said Raman conversion of the secondary photons in order that the conversion is spread over time depending on their respective wavelengths, and forms a broad-spectrum output beam having an energy that is distributed substantially constantly.

2. The device as claimed in claim 1, wherein the power density per meter of optical fiber is higher than 0.2 kW/µm²/m.

3. The device as claimed in claim 1, further comprising a filter installed downstream of the optical fiber and that is able to let pass only secondary photons having wavelengths included in a predefined interval, in order to deliver a filtered output beam taking the form of pulses of a duration equal to their difference in spread over time.

4. The device as claimed in claim 1, further comprising, between the optical fiber and the forming device, a desymmetrization device able to increase the temporal asymmetry of the input beam.

5. The device as claimed in claim 1, wherein the optical fiber is a single-mode optical fiber.

6. The device as claimed in claim 1, wherein the pulsed laser source is able to deliver the primary photons in pulses having a duration comprised between a few hundredths of nanoseconds and a few tens of nanoseconds.

7. The device as claimed in claim 1, further comprising a resonant cavity including i) a dichroic entrance mirror that is able to receive the input beam, and to which an entrance of the optical fiber is securely fastened, and ii) an exit mirror that is able to deliver the output beam.

8. The device as claimed in claim 1, wherein the optical fiber is doped with rare-earth ions, and includes an auxiliary laser source that is able to inject, into the optical fiber, auxiliary photons that are intended to interact with the rare-earth ions in order to induce an amplification of the generation of the primary photons, so as to allow an increase in the conversion to secondary photons.

9. The device as claimed in claim 1, wherein the optical fiber is doped with ions that are able to exacerbate non-linear effects in the optical fiber in order to induce an increase in the conversion to the secondary photons.

10. A sample-analyzing system, comprising:
    the generating device as claimed in claim 1, configured to deliver a polychromatic output beam for analyzing the sample.

11. The system as claimed in claim 10, configured to carry out an analysis of the sample by multiplex coherent anti-Stokes Raman scattering.

12. The system as claimed in claim 11, further comprising a temporal detector.

13. The device as claimed in claim 2, further comprising a filter installed downstream of the optical fiber and that is able to let pass only secondary photons having wavelengths included in a predefined interval, in order to deliver a filtered output beam taking the form of pulses of a duration equal to their difference in spread over time.

14. The device as claimed in claim 1, further comprising, between the optical fiber and the forming device, a desymmetrization device able to increase the temporal asymmetry of the input beam.

15. The device as claimed in claim 2, further comprising, between the optical fiber and the forming device, a desymmetrization device able to increase the temporal asymmetry of the input beam.

16. The device as claimed in claim 3, further comprising, between the optical fiber and the forming device, a desymmetrization device able to increase the temporal asymmetry of the input beam.

17. The device as claimed in claim 1, wherein the optical fiber is a single-mode optical fiber.

18. The device as claimed in claim 2, wherein the optical fiber is a single-mode optical fiber.

19. The device as claimed in claim 3, wherein the optical fiber is a single-mode optical fiber.

* * * * *